Figures 1, 2:
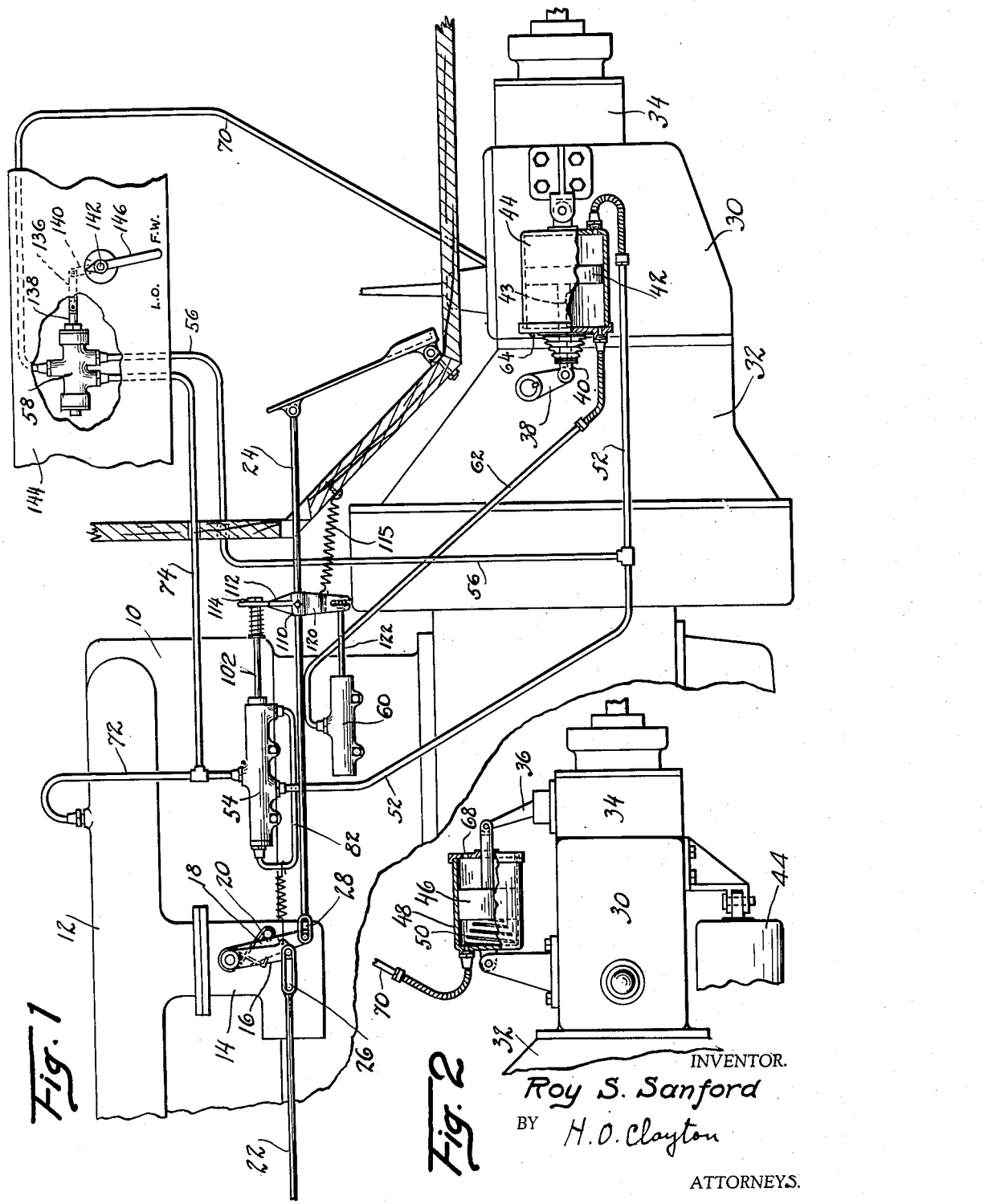

Sept. 27, 1938.   R. S. SANFORD   2,131,075
CLUTCH OPERATING MECHANISM
Filed Sept. 27, 1935   3 Sheets-Sheet 1

INVENTOR.
Roy S. Sanford
BY H. O. Clayton
ATTORNEYS.

Sept. 27, 1938.    R. S. SANFORD    2,131,075
CLUTCH OPERATING MECHANISM
Filed Sept. 27, 1935    3 Sheets-Sheet 2
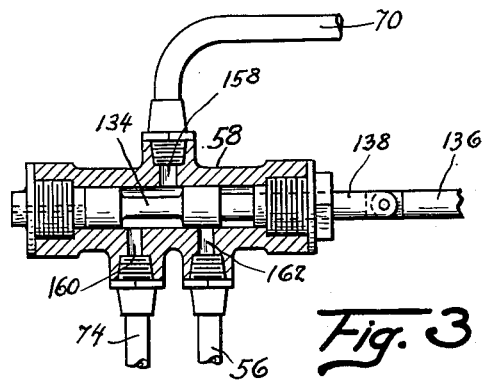
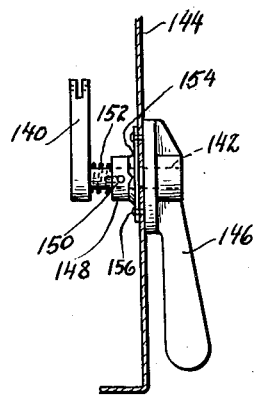
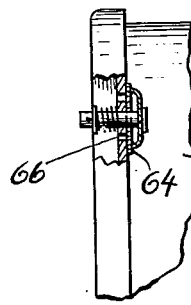
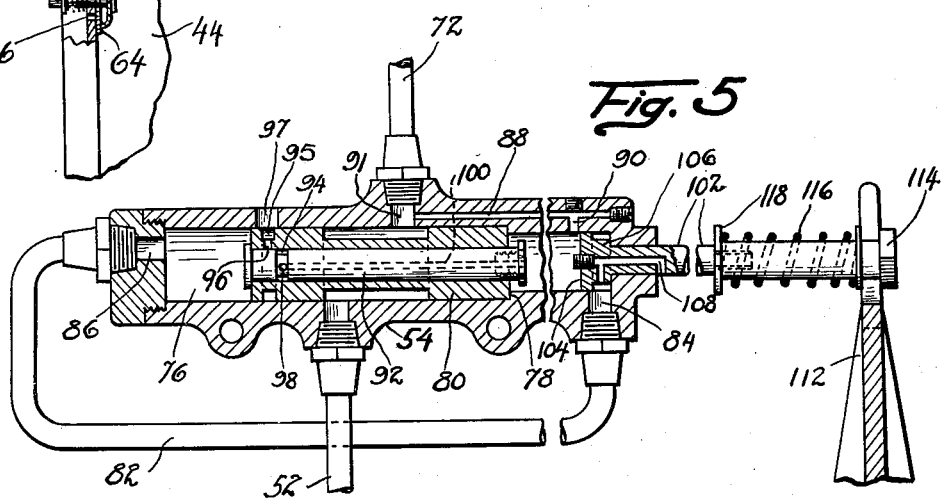
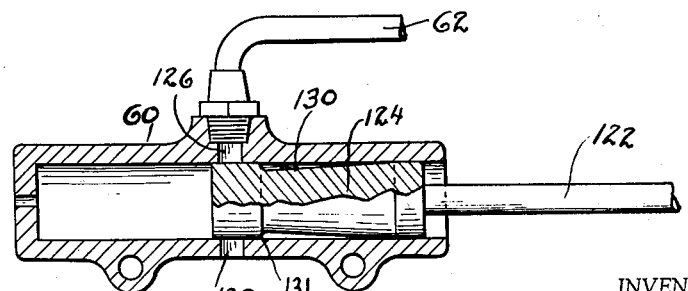
INVENTOR.
Roy S. Sanford
BY  H. O. Clayton
ATTORNEYS

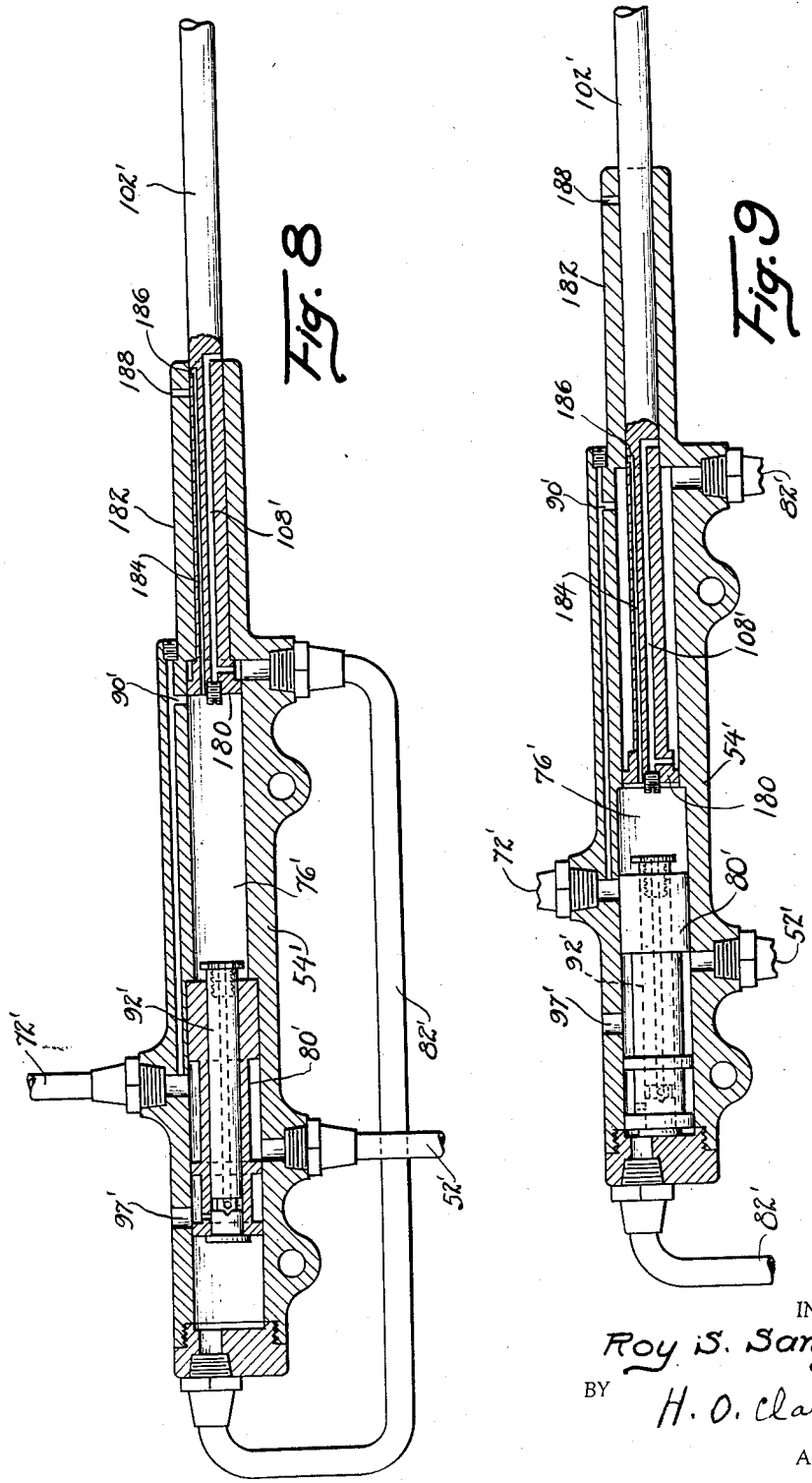
Sept. 27, 1938.   R. S. SANFORD   2,131,075
CLUTCH OPERATING MECHANISM
Filed Sept. 27, 1935   3 Sheets-Sheet 3
INVENTOR.
Roy S. Sanford
BY H. O. Clayton
ATTORNEYS.

Patented Sept. 27, 1938

2,131,075

UNITED STATES PATENT OFFICE 2,131,075

CLUTCH OPERATING MECHANISM

Roy S. Sanford, New York, N. Y., assignor to Bendix Products Corporation, South Bend, Ind., a corporation of Indiana Application September 27, 1935, Serial No. 42,418

4 Claims. (Cl. 192—.01)

My invention relates to automotive control mechanism and has particular reference to a power operated clutch and free wheeling unit.

An object of the invention is to associate the conventional clutch actuating mechanism and the ordinary free wheeling unit installed rearwardly of the transmission with a vacuum system operable automatically in conjunction with manipulation of the accelerator pedal controlling the engine speed. The engine is de-clutched from the drive shaft and the free wheeling unit is brought into play automatically upon releasing the accelerator pedal to relieve both ends of the transmission mechanism of load, such relief at each end permitting rapid manipulation of the gear shift mechanism without clash. Means are provided whereby the free wheeling unit may be retained in free wheeling position if desired, the vacuum lines and controls therefor being adapted to govern this phase of the system through manual manipulation of a hand lever placed upon the dash of the vehicle.

A further object of the invention is to incorporate with the power mechanism associated with the clutch actuating means an improved bleed valve whereby upon depression of the accelerator pedal the exhaust portion of the cylinder is first rapidly vented to air and subsequently restricted as to the volume and rate of air outlet for the purpose of insuring a gradual engagement of the clutch unit by cushioning the movement of the piston in the power cylinder.

Another object of the invention resides in the provision of a vacuum servo valve associated with the accelerator pedal in such manner that it operates automatically when no longer restrained by the accelerator. An important feature of the improved control resides in the servo feature of the valve whereby slight movement of the primary control element automatically causes a substantial movement of the secondary valve, which secondary valve operates to open and close certain of the vacuum lines associated with the vehicle control mechanism. It is desirable to utilize as little mechanically actuated movement as possible in controlling the vacuum lines, but at the same time substantial movement is often essential in order to provide for the various port controls essential to satisfactory operation.

Various other meritorious features will be apparent from the following description taken in conjunction with the drawings wherein like numerals refer to like parts throughout the several figures and wherein:

Fig. 1 is a somewhat diagrammatic illustration of the complete system,

Fig. 2 is a plan view of the free wheeling unit and its power operating means, partly in section, Fig. 3 is a section through the manually operable dash control free wheeling valve, Fig. 4 is a section illustrating the mechanism for actuating said valve, Fig. 5 is a section through my improved servo vacuum control valve, Fig. 6 is a section through my improved cushioning valve, Fig. 7 is an elevation, partly in section, illustrating the air vent in the clutch operating power cylinder, Fig. 8 is a section through a modified valve similar in its function to that of Fig. 5, illustrating the parts in accelerator released position, and Fig. 9 is a section illustrating the valve of Fig. 8 as positioned when the accelerator is normally depressed.

Referring now to the diagrammatic illustration of Fig. 1, the system comprises an internal combustion engine 10 provided with a conventional intake manifold 12 having a carburettor 14 associated therewith. Throttle control arms 16 and 18 are retained in motor idling position by means of a spring 20 and the arms are connected to hand actuated throttle rod 22 and accelerator rod 24 respectively through the lost motion connections indicated at 26 and 28.

A transmission 30 is positioned behind the clutch mechanism 32 and a free wheeling unit 34 is mounted rearwardly of the transmission. A lever 36 functions to draw the free wheeling unit into locked out position or free wheeling position. The clutch actuating arm 38 is pivotally connected to the extremity of piston rod 40 and is in this manner operated by the piston 42 positioned in the clutch operating power cylinder 44. The arm 36 is connected in similar manner to piston 46 in free wheeling power operator 48, this piston being normally positioned at one extremity of the cylinder by means of a spring 50, which spring functions to retain the arm 36 in position to hold the free wheeling unit in locked out position.

One end of a clutch operating power cylinder 44 is connected through conduit 52 with my improved vacuum control valve 54, this conduit being provided with a branch conduit 56 which opens into the valve chamber of the free wheeling control valve 58. The opposite extremity of the clutch operating cylinder communicates with the cushion valve 60 through a vacuum conduit 62 for the purpose of venting the exhaust end of the cylinder to air in a manner to be described hereinafter. The clutch operating cylinder is provided at its exhaust end with a one-way vent valve clearly illustrated in Fig. 7 and comprising a spring actuated valve member 64 operating to close vents 66 against the outward passage of air but permitting inward flow therethrough.

The free wheeling power cylinder 46 is provided with an air vent 68 at its exhaust end and the other communicates with a vacuum line 70 which opens into the chamber of free wheeling control valve 58. The intake manifold 12 communicates with the chamber of control valve 54 through a conduit 72, which conduit is provided with a branch line 74 opening into the chamber of free wheeling control valve 58.

Referring now more particularly to the construction of the improved servo valve 54 illustrated in detail in Fig. 5, the valve chamber 76 is provided with a shoulder 78 against which a slidable spool valve 80 is adapted to seat, thus limiting the rearward movement of said valve. A conduit 82 connects the opposite extremities of valve chamber 76 through ports 84 and 86 provided therefor. The valve casing is provided with a longitudinal passage 88 which communicates through port 90 with the rear end of the valve chamber, thereby providing a passage from said end to the valve port 91 which is connected directly to the vacuum conduit 72 extending to the intake manifold.

Valve 80 is provided with an axial bore adapted to slidably receive a cylindrical valve 92 which is of slightly greater length than the spool valve 80 and provided with stop heads 93' at each end thereof, as clearly illustrated. The cylindrical valve 92 is provided with a groove 94 adapted to register with port 96 in the forward head of the spool valve. Port 96 opens into an annular groove 95 extending around the circumference of the head of said spool valve. The groove 94 is provided with a transverse bore 98 communicating with an axial bore 100 which extends through the valve 92 from the groove 94 and opens into the rear end of the main valve chamber 76. Groove 95 is adapted to register with air port 97 on the valve casing.

Slidable axially through the rear end of the valve casing 54 is a plunger 102. One extremity of this plunger forms a secondary valve 104 slidable within the rear end of the valve chamber 76 and operable on initial axial movement to close the port 90. Rearward movement of the plunger and secondary valve 104 is limited by abutment of the restricted rear portion 106 of the said valve against the end of the valve casing. When the plunger 102 is in the position illustrated in Fig. 5, wherein the accelerator pedal is released, air will flow through passage 108 and through the conduit 82 to the forward end of the valve chamber 76. In this position the rear end of the valve chamber is in communication with the vacuum conduit 72 through port 90 and for that reason the spool valve 80 will be moved or retained in or to the position illustrated in Fig. 5. The cylindrical valve 92 will also be retained in the position illustrated. When the parts are in this position it will be apparent that the line 52 to the clutch operating cylinder 44 is open to vacuum conduit 72.

The accelerator rod 24 has secured thereto a double ended bracket 110, the upper arm 112 of which provides a disconnected stop restraining the forward movement of plunger 102 by engagement with the enlarged head 114. The rod 24 is normally retained in motor idling position by means of spring 116.

A spring 116 is seated at one extremity against a flange 118 associated with plunger 102 and at its other against arm 112 of bracket 110. This spring functions to constantly urge the head 114 of plunger 102 against the bracket 110. It will be noted that the valve 54 and the connecting conduit 82 between the ends of the valve chamber 76 are broken away in Fig. 5. The actual proportions and relative spacing between valve ports, et cetera, is more clearly indicated in Figs. 8 and 9 wherein a modified form of valve structure is disclosed.

As already stated, the valve mechanism in Fig. 5 has been illustrated as in the position occupied when the accelerator pedal is released. It will be noted that the port 91 is in communication with conduit 52 through the cut away portion 80' of spool valve 80, thereby establishing a vacuum in the clutch operating cylinder 44 to de-clutch the engine. Upon initial depression of the accelerator pedal the bracket 110 will move plunger 102 forwardly, the spring 116 being of a strength which is sufficient to prevent yielding thereof at any stage of operation. At this point the admission of air through the passageway 108 will be closed and the port 90 will be closed simultaneously to stop active maintenance of vacuum in the rear end of the valve chamber 76. Further movement of plunger 102 will open the forward end of valve chamber 76 to the suction in line 72 through conduit 82 and port 90, thereby eliminating the air in the forward portion of valve chamber 76 and creating a positive vacuum there. Forward movement of piston 104 will decrease the degree of vacuum between piston 104 and valve 80 and in this way the vacuum existing theretofore at this point will be partially reduced. By reason of the fact that a greater vacuum is created in valve chamber 76 at its forward end at this stage of the operation, producing a partial vacuum as distinguished from a positive vacuum at the rear end of the cylindrical valve 92 it will be forced axially through the spool valve 80 to open the air port 97 to groove 94 and axial passage 100 of the said cylindrical valve. In this way air is admitted to the rear end of valve chamber 76 and the entire spool valve is slapped rapidly forward to close the port 91. When the spool valve has reached the extreme forward limit of its movement port 90 will be closed but the forward head of the valve will have opened the air port 97 in the valve casing to communication with conduit 52 extending to the clutch operating cylinder 44. At this point a release movement of piston 42 begins.

Release movement of piston 42 is permitted by open air vents in the head of the booster cylinder 44 and is controlled by an improved cushion valve 60 clearly illustrated in Fig. 6. The action thus described takes place upon the initial depression of the accelerator pedal which actuates the rod 24. The bracket 110 secured to rod 24 is provided with a downwardly extending arm 120 which is positively connected with the stem 122 of valve 124 which is slidable within the valve casing 60. As clearly illustrated in Fig. 1 the vented end of booster cylinder 44 is connected through conduit 62 and the valve port 126 with the valve 60. Upon depression of the accelerator pedal the operation heretofore described takes place. The rear end of the power cylinder 44 is vented to the atmosphere through valve 54 and conduit 52. As the piston 42 moves forwardly the air on the forward side of said piston escapes through a slot 43 provided in the piston stem 40. The length of this slot is such that the outward passage or exhaust of the air from the cylinder is closed at substantially the point where depression of the accelerator has taken up the lost motion provided by the lost motion connection 28 through which the carburettor valve is actuated.

At this point the air forwardly of the piston 42 is compressed in the forward end of the power cylinder sufficiently to counterbalance the action of the clutch springs, preventing actual engagement of the clutch plates. At this point the valve 124 in the bleed valve casing 60 begins to open the ports 126 and 128 to provide for further exhaust of the compressed air at the forward end of the power cylinder. The valve ports 126 and 128 and the valve member 124 may be so positioned and shaped that the said ports 126 and 128 will gradually create an increasing exhaust passage for the power cylinder at any point during the depression of the accelerator pedal.

If the accelerator pedal is gradually depressed to raise the motor speed when a gradual acceleration of the car is desired, the opening of the ports 126 and 128 will be correspondingly gradual, thereby insuring gradual engagement of the booster clutch through slow movement of the booster piston 42. If the accelerator is depressed sharply it is obvious that the motor speed will be brought rapidly up and the valve 124 is so tapered, as indicated at 130, that a maximum exhaust of air is permitted, thereby providing rapid engagement of the clutch which may be conveniently handled by the increased R. P. M. of the motor at that stage of accelerator depression.

The travel of the valve 124 corresponds to the travel of the accelerator pedal and by reason of the particular shape of the valve 124, including the taper 131 and the reverse taper 130, a gradual exhaust of air is insured when the accelerator pedal is depressed sufficiently to increase the R. P. M. of the motor only slightly and also when the accelerator pedal is sharply depressed, as when a rapid gear shift is made at a considerable speed. This latter action is desirable for the purpose of permitting the R. P. M. of the motor to catch up to the R. P. M. of the drive shaft in order to eliminate jerky engagement of the clutch.

Returning now to control of the free wheeling unit 34, movement of spool valve 134 in free wheeling control valve 58 is secured by a link 136 connected to the projecting stem 138 of said valve, which link is pivotally secured to an arm 140. Arm 140 is fixedly secured to the extremity of a shaft 142 rotatably journalled in the dash panel 144 and to the other extremity of shaft 142 is secured a manually operable lever 146. A clutch collar 148 is rotatable with shaft 142 and slidable therealong through a pin and slot connection indicated at 150. Spring 152 urges the said collar 148 into engagement with a cooperating clutch collar 154 which is fixedly positioned to the dash panel as by screws 156. The valve 134 may be actuated therefore through lever 146 and retained in either free wheeling or locked out position.

The drawings illustrate the various control mechanisms in position to maintain free wheeling constantly during operation of the vehicle. Under such circumstances valve ports 158 and 160 of free wheeling control valve 58 are in communication and a vacuum is constantly maintained through conduits 74 and 70 to the free wheeling power cylinder 48, thereby maintaining the piston 46 thereof in free wheeling position against the resistance of spring 50.

When the valve 134 is shifted by means of lever 146 this direct vacuum communication is closed and communication is established between port 158 and port 162, the latter being connected to the conduit 56. Under such circumstances free wheeling unit 34 will normally be retained in locked out position through spring 50 in the booster 48. However, when the vacuum conduit 52 is open to create vacuum in clutch power cylinder 44 it will also operate through line 56, valve 58, and conduit 70 to actuate piston 46 of the free wheeling power cylinder to automatically throw the free wheeling unit 34 into free wheeling position. Obviously this action will occur only upon release of the accelerator, at which time the clutch power cylinder operates to declutch the engine and the result will be to unload both ends of the transmission mechanism 30 whereby easy gear shifting without clash may be secured.

In Figs. 8 and 9 a modified form of control valve 54' has been illustrated in its two extreme limits of movement. This valve is the same in every way as that illustrated in Fig. 5 with the exception of the fact that the servo valve 180, which is mechanically actuated through the accelerator rod 24, provides means for admitting air momentarily into the rearward portion of the valve chamber 76'. In this way the vacuum established in the forward portion of the valve chamber cooperates with the normal atmospheric pressure thus admitted to the other end of the chamber to actuate the cylindrical valve 92' rather than with a partial vacuum, as with the structure of Fig. 5.

Describing the structure somewhat more in detail, it will be noted that the rear end of the valve casing 54' projects some distance rearwardly as indicated at 182, the valve stem 102' being slidable therein as in the other structure. Upon initial depression of the accelerator pedal the stem 102' will be urged forwardly to first close the rear portion of the valve chamber 76' from the vacuum line 72' by closing the port 90'. As the head of the servo valve 180 passes the port 90', the forward end of chamber 76' will be in communication with the vacuum line 72' to withdraw the air from that end of the chamber. At this point the rear end of the chamber 76' will be momentarily vented to air through the longitudinal passageway 184 which communicates through transverse port 186 at its rear extremity with the air vent 188. This momentary admission of air ahead of the servo valve 180 at the time when the forward portion of the valve chamber 76' is substantially evacuated operates to force the cylindrical valve 92' axially through the spool valve 80' to permit the passage of air through the air port 97' to the rear portion of the valve chamber, thus maintaining the differential pressure between the forward and rearward ends of the chamber to force the spool valve 80' to its forward limit of movement.

As clearly indicated in Fig. 8 the forward portion of the valve chamber is opened to atmospheric pressure through the connecting conduit 82' and the longitudinal passage 108' in the valve stem 102' when the accelerator is in its released position. Fig. 9 illustrates the position of the valve members when the accelerator is fully depressed for driving purposes, the line 52' having been vented to air through port 87' and cut off completely from the vacuum in line 72'.

While certain preferred structures have been illustrated in the accompanying drawings various modified forms will be apparent to those skilled in the art and for that reason I wish to limit myself only within the scope of the appended claims.

I claim:

1. Valve mechanism including a cylindrical chamber shouldered intermediate its ends, a vacuum operated spool valve slidable within the same on one side of said shoulder, means placing the ends of the chamber in fluid-transmitting connection and a valve having a stem extending through the end of the valve casing on the other side of said shoulder.

2. Valve mechanism including a cylindrical casing having a shoulder intermediate its ends, a spool valve slidable within said chamber on one side of said shouldered portion, a cylindrical valve of greater length than said spool valve slidable axially through said spool valve and including stop heads at each extremity thereof, and a secondary valve slidable within said chamber on the other side of said shouldered portion having a stem portion extending through the end of the valve casing.

3. Valve mechanism including a cylindrical chamber, a conduit providing communication between the ends of said chamber, a spool valve slidable within said chamber intermediate the extremities thereof, and a valve member slidable within said chamber at one extremity thereof, said valve including the vent providing communication between the atmosphere and one end of said connecting conduit when said valve is at one limit of its movement, said valve being operable on initial movement thereof to close said air communication.

4. In combination with a vacuum source, a valve chamber and a valve member slidable therein, a conduit connecting the end portions of said valve chamber, and a valve member positioned within said chamber normally operable to vent one end of said valve to the atmosphere and operable upon initial actuation thereof to close said vent and open the vacuum source to communication with said aforementioned end of the valve.

ROY S. SANFORD.